United States Patent
Heininger

(10) Patent No.: US 8,427,287 B2
(45) Date of Patent: Apr. 23, 2013

(54) METHOD FOR OPERATING AN ACCESS ARRANGEMENT

(75) Inventor: Franz Heininger, Witzmannsberg (DE)

(73) Assignee: Continental Automotive GmbH, Hannover (DE)

( * ) Notice: Subject to any disclaimer, the term of this patent is extended or adjusted under 35 U.S.C. 154(b) by 1129 days.

(21) Appl. No.: 12/306,821

(22) PCT Filed: Jun. 28, 2007

(86) PCT No.: PCT/EP2007/056490
§ 371 (c)(1),
(2), (4) Date: Jan. 21, 2009

(87) PCT Pub. No.: WO2008/000795
PCT Pub. Date: Jan. 3, 2008

(65) Prior Publication Data
US 2011/0316680 A1 Dec. 29, 2011

(30) Foreign Application Priority Data
Jun. 30, 2006 (DE) .......................... 10 2006 030 298

(51) Int. Cl.
*B60Q 1/00* (2006.01)
(52) U.S. Cl.
USPC ........ 340/425.5; 340/5.2; 340/10.1; 340/505; 340/506; 340/539.1; 340/539.11; 340/539.13; 340/539.32; 340/572.1
(58) Field of Classification Search .................. 340/5.2, 340/10.1, 505, 506, 539.1, 539.11, 539.13, 340/539.32, 572.1
See application file for complete search history.

(56) References Cited

U.S. PATENT DOCUMENTS
7,663,471 B2 * 2/2010 Nakashima et al. ........... 340/5.2

FOREIGN PATENT DOCUMENTS

| DE | 10064141 A1 | 7/2002 |
|---|---|---|
| DE | 10316306 A1 | 10/2004 |
| DE | 10334624 A1 | 3/2005 |
| DE | 10 2004 003701 A1 | 8/2005 |
| DE | 102004003701 A1 | 8/2005 |
| EP | 1 416 776 A2 | 5/2004 |
| EP | 1416776 A2 | 5/2004 |
| JP | 2000045593 A | 2/2000 |
| JP | 2001-236995 A | 8/2001 |

OTHER PUBLICATIONS

Written Opinion of the International Searching Authority (Supplementary Sheet) for PCT/EP2007/056490, 3 pages, Apr. 2005.

* cited by examiner

*Primary Examiner* — Daryl Pope
(74) *Attorney, Agent, or Firm* — King & Spalding L.L.P.

(57) ABSTRACT

In a method for operating an access arrangement (ZA) for a vehicle (FZ), access to the vehicle can be obtained by a mobile identification transmitter (IDG). With this method, first an ambient brightness around the vehicle is determined. Furthermore, the presence of an authorized mobile identification transmitter in an approach region (ANB, ANB2) around the vehicle is examined. Finally, an activation signal (LSS) for an illumination source (BL) of the vehicle is issued when the ambient brightness drops below a predetermined brightness value and the presence of an authorized mobile identification transmitter is detected in the approach zone. In this way, efficient activation of the illumination source can be achieved.

17 Claims, 4 Drawing Sheets

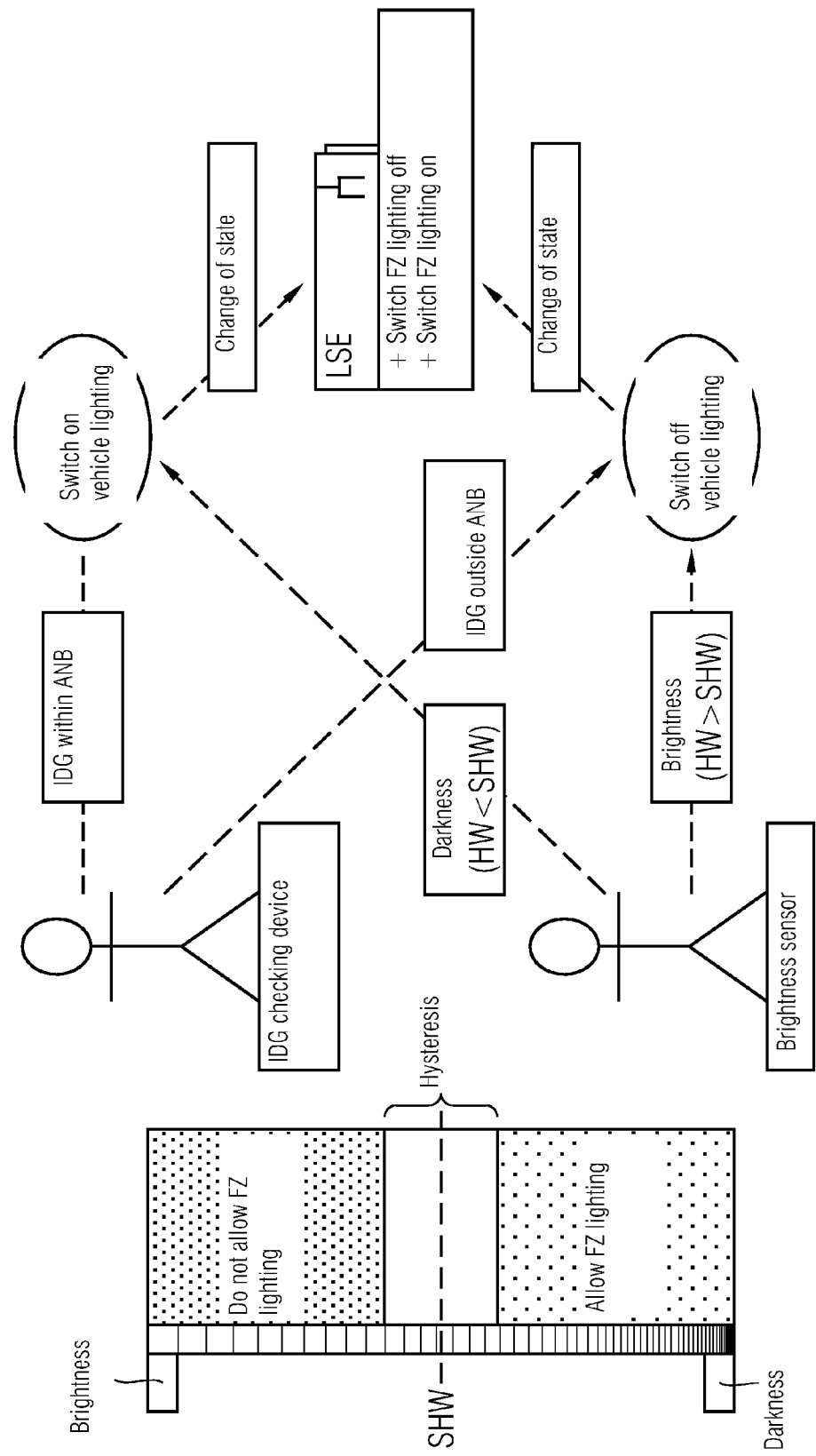

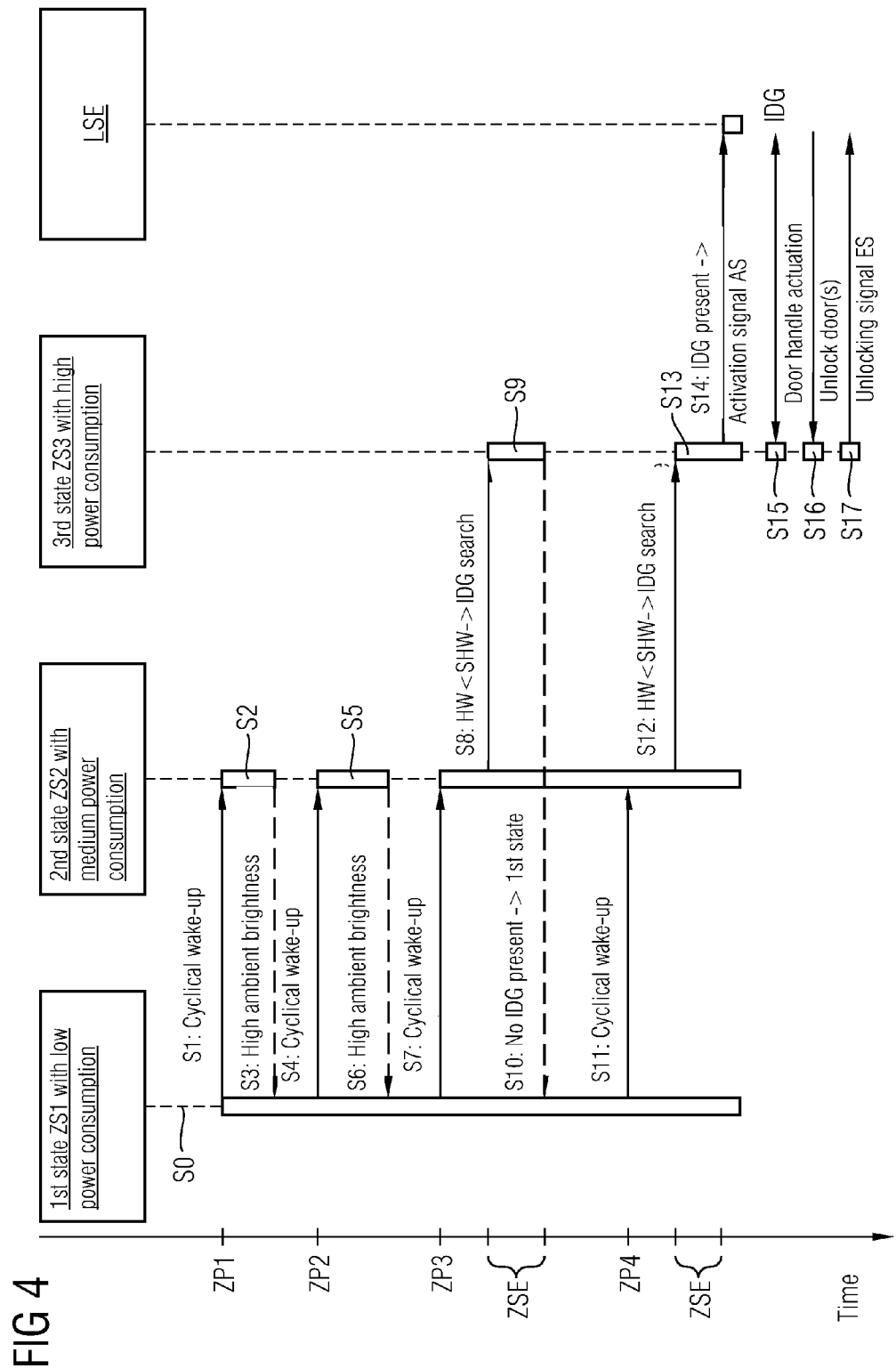

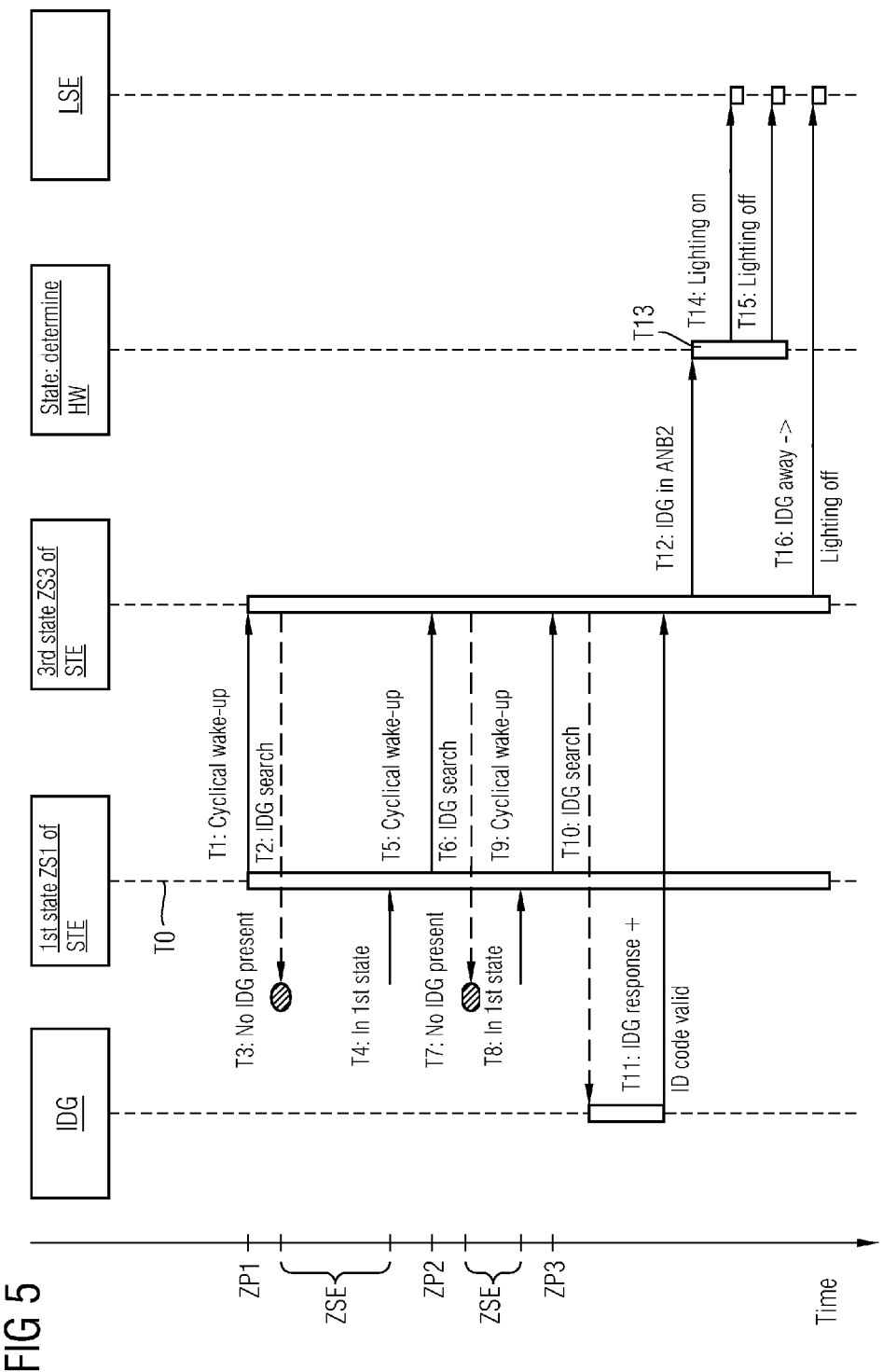

METHOD FOR OPERATING AN ACCESS ARRANGEMENT

CROSS-REFERENCE TO RELATED APPLICATIONS

This application is a U.S. National Stage Application of International Application No. PCT/EP2007/056490 filed Jun. 28, 2007, which designates the United States of America, and claims priority to German Application No. 10 2006 030 298.2 filed Jun. 30, 2006, the contents of which are hereby incorporated by reference in their entirety.

TECHNICAL FIELD

The present invention relates to a method for operating an access arrangement or more specifically access authorization arrangement for a vehicle, in particular a motor vehicle, and an access arrangement itself.

BACKGROUND

In order to prevent unauthorized entry to a vehicle, modern access authorization systems or access arrangements in vehicles use electronic security systems in which, in order to authenticate a user, data is communicated between a first communications device of the vehicle and a second communications device in the user's mobile identification transmitter, such as a key or key fob. For this purpose, challenge signals with a particular field strength are first sent out at regular time intervals by the first communications device of the vehicle in order to check whether a mobile identification transmitter is in a proximity area around the vehicle. As a mobile identification transmitter approaches the vehicle and can finally receive its challenge signals, it will respond to receiving a challenge signal with a data telegram comprising a characteristic identification code. In the vehicle, checking of the received identification code can then take place and, in the event of a positive, i.e. successful, result, the validity or the authorization of the approaching identification transmitter can be ascertained.

As a special convenience function, today's access authorization systems provide so-called "welcome lighting" functionality whereby, when an authorized mobile identification transmitter has been detected in the above mentioned proximity area around the vehicle, which can encompass a radius of several meters around the vehicle, lighting sources inside the vehicle such as flashing indicators, dipped beam headlights, interior lighting, etc. can be switched on. The welcome lighting can remain on for a particular length of time after detection of the authorized identification transmitter, or also until such time as the authorized identification transmitter moves away from the vehicle again (i.e. is outside the proximity area).

Particularly in the case of so-called "town cars" which are only moved relatively little, but are frequently entered and exited, the problem may arise that, because of the frequent triggering of the welcome lighting, the car battery is progressively discharged over time. In other words, the ratio of battery charging time to battery drain is particularly poor (in favor of battery drain). The only conceivable solution to this problem would be, particularly for town cars, to use larger-sized car batteries which, however, mean both additional weight and unnecessarily large space requirement.

SUMMARY

According to various embodiments, a means of efficiently operating an access arrangement for a vehicle can be created.

According to an embodiment, a method for operating an access arrangement for a vehicle, wherein access to the vehicle can be obtained by means of a mobile identification transmitter, may comprise the following steps: Determining an ambient brightness around the vehicle; checking for the presence of an authorized mobile identification transmitter in a proximity area around the vehicle; Outputting an activation signal for a lighting source of the vehicle if the ambient brightness is below a predetermined brightness value and the presence of an authorized mobile identification transmitter is detected in the proximity area.

According to a further embodiment, the ambient brightness may be first determined and the presence of the identification transmitter is only checked for if an ambient brightness below the predetermined brightness value is present. According to a further embodiment, a control device may be switched from a first state with low power consumption to a second state with medium power consumption at defined instants in order to initiate measurement of the ambient brightness, the control device being returned to the first state ZS1 with low power consumption if an ambient brightness above the predetermined brightness value is measured. According to a further embodiment, if an ambient brightness below the predetermined brightness value is detected, the control device may be switched to a third state with high power consumption in order to check for the presence of an authorized identification transmitter. According to a further embodiment, the presence of an authorized identification transmitter may be first checked for, and, in the event of a positive result, forwarding of the ambient brightness around the vehicle is performed. According to a further embodiment, at defined instants a control device can be switched from a first state with low power consumption to a third state with high power consumption in order to check for the presence of the authorized identification transmitter, the control device reverting to the first state with low power consumption in the event of a negative result. According to a further embodiment, to determine the ambient brightness at least two ambient brightness values can be measured. According to a further embodiment, if one ambient brightness value measured is greater than the predetermined brightness value and a second ambient brightness value measured is less than the predetermined brightness value at least one other ambient brightness value can be measured to determine the ambient brightness. According to a further embodiment, after successful verification of the presence of the authorized mobile identification transmitter, authentication can be carried out on the part of the vehicle with the identification transmitter in order to enable at least one door of the vehicle to be unlocked.

1 According to another embodiment, an access arrangement for a vehicle, wherein access to the vehicle can be obtained by means of a mobile identification transmitter, may comprise the following features: a brightness sensor for measuring the ambient brightness around the vehicle; a transceiver for checking for the presence of an authorized identification transmitter in a proximity area around the vehicle; and a control device for outputting an activation signal for a lighting source if the ambient brightness is less than a predetermined brightness value and the presence of an authorized mobile identification transmitter is detected in the proximity area.

According to a further embodiment, the control device can be assigned a timer which switches the control device from a first state with low power consumption to a second state with medium power consumption in which the control device triggers the brightness sensor to measure the ambient brightness. According to a further embodiment, the control device may revert to the first state with low power consumption if the ambient brightness measured by the brightness sensor is above the predetermined brightness value. According to a further embodiment, the control device may assume a third state with high power consumption if the ambient brightness value measured by the brightness sensor is below the predetermined brightness value, in order to trigger the transceiver SE to check for the presence of an authorized identification transmitter. According to a further embodiment, the control device may be assigned a timer which switches the control device from a first state with low power consumption to a third state with high power consumption in which the control device triggers the transceiver to check for the presence of the mobile identification transmitter. According to a further embodiment, the control device may revert to the first state if no mobile identification transmitter has been detected in the proximity area. According to a further embodiment, the control device, after successfully checking for the presence of the mobile identification transmitter, additionally may trigger the brightness sensor to measure the ambient brightness. According to a further embodiment, the brightness sensor may have a photodiode, in particular with built-in color correction filter for the visible wavelength region.

According to yet another embodiment, a motor vehicle may have such an access arrangement as described above.

BRIEF DESCRIPTION OF THE DRAWINGS

Exemplary embodiments will now be explained in greater detail with reference to the accompanying drawings in which:

FIG. 2 is a diagram illustrating the condition as to what ambient brightness of the vehicle causes a lighting source to be activated;

FIG. 3 schematically illustrates light control for a lighting source as a function of two conditions;

FIG. 4 is a flow chart illustrating the operation of the access arrangement according to a first embodiment;

FIG. 5 is a flow chart illustrating the operation of the access arrangement according to a second embodiment.

DETAILED DESCRIPTION

Figure 1:
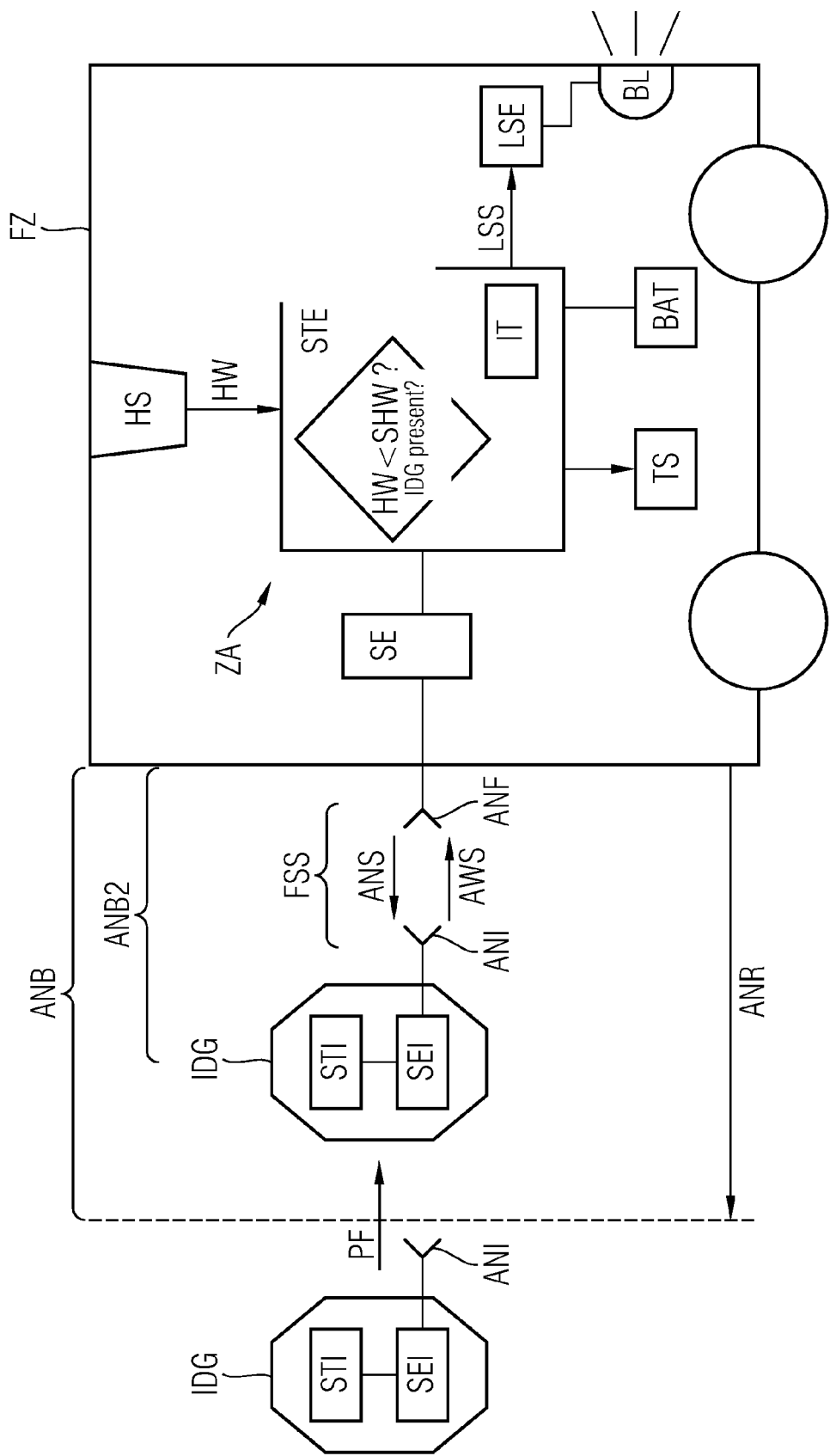
FIG. 1 schematically illustrates a keyless electronic access authorization system or access arrangement in a vehicle according to an embodiment.

A method for operating an access arrangement or more specifically access authorization arrangement for a motor vehicle, wherein access to the vehicle can be obtained by means of a mobile identification transmitter, comprises the following steps. An ambient brightness of the vehicle is determined. In addition, the presence of an authorized mobile identification transmitter in a proximity zone around the vehicle is checked. An activation signal for a lighting source or rather lighting device is finally output if the ambient brightness of the vehicle is below a predefined brightness value and the presence of an authorized mobile identification transmitter is detected in the proximity zone. In the case of the access arrangement just described, this means a vehicle lighting source for "welcome lighting" functionality is only activated when this is necessary or useful, i.e. if the vehicle is in a dark environment. In this way the power consumption can be reduced through efficient operation of the access arrangement, and therefore the service life of a vehicle energy source such as the car battery can also be increased.

According to an advantageous embodiment of the method, the ambient brightness of the vehicle is first determined and the presence of an authorized mobile identification transmitter is only checked for if an ambient brightness below the predetermined brightness value is present (i.e. a corresponding activation signal is output). Because of the fact that in this case a first condition for the outputting of an activation signal is checked for first and only if this condition (low ambient brightness of the vehicle or darkness around the vehicle) is present or fulfilled is the other condition actually checked for, the power consumption can be reduced still further, since if the first condition is not fulfilled, checking for the second condition is not performed at all.

According to another advantageous embodiment, a control device is switched from a first state with low power consumption to a second state with medium or higher power consumption at defined intervals (at defined time instants) in order to initiate ambient brightness detection, the first state with low power consumption being reinstated if an ambient brightness above the predetermined brightness value is detected. This also again helps to reduce power consumption, as the control device is in the first state with low power consumption between the defined time instants, and is only "woken up" at the defined time instants in order to enable the ambient brightness of the vehicle to be measured in the second state with medium power consumption. Finally, if an ambient brightness of the vehicle below the predetermined brightness value is detected/determined, the control device can be switched to a third state with high power consumption in order to check for the presence of an authorized identification transmitter. If an authorized mobile identification transmitter is now detected in the proximity zone or proximity area around the vehicle, the activation signal for the lighting source (e.g. for implementing the welcome lighting) is finally output. If, on the other hand, no authorized mobile identification transmitter is found in the proximity zone around the vehicle, the control device is reset to the first state with low power consumption.

According to another advantageous embodiment it is also conceivable, however, for the presence of an authorized mobile identification transmitter to be checked for first, and for the ambient brightness around the vehicle to be determined only if the check is successful. A control device can again be switched from a first state with low power consumption to a third state with high power consumption at defined time intervals (or rather at defined time instants) in order to check for the presence of the authorized mobile identification transmitter, the first state with low power consumption being reinstated in the control device if the check is negative. This means that also in this embodiment power consumption can be reduced, since once again, if a first condition is not present, the presence of the second condition is not checked for at all. In addition, the control device is normally in the first state with low power consumption for the longest time, i.e. during the defined time intervals, and is only "woken up" at the defined time instants in order to check for the presence of an authorized mobile identification transmitter. If according to the embodiment described the presence of an authorized identification transmitter is ascertained, determination of the ambient brightness of the vehicle is then performed. If in this respect an ambient brightness below the predetermined brightness value is also found, the activation signal for the lighting source of the vehicle is finally output; if, on the other hand, a brightness value above the predetermined brightness value is found, the control device is switched back to the first state with low power consumption.

In order to ensure that the ambient brightness is reliably determined, at least two ambient brightness values are measured. This can be useful in particular if the ambient brightness varies or changes quickly. If, for example, the vehicle is parked at a location where other vehicles or even pedestrians frequently pass, it is conceivable that another vehicle will be passing the measuring vehicle at the very instant that an ambient brightness value is being measured, causing a low ambient brightness value, i.e. an ambient brightness value with low light intensity, to be recorded. Finally, if the passing vehicle has passed the measuring vehicle, it may be the case that an ambient brightness value with greater light intensity is recorded. It becomes particularly complicated if the first recorded ambient brightness value is below the predetermined brightness value and the second ambient brightness value is above the predetermined brightness value. In the first case, the first condition for activating the lighting source would obtain, but not in the second case. In order finally to find a solution for this uncertain situation with regard to the actual ambient brightness, it is conceivable for at least one other ambient brightness value for determining the (actual) brightness value to be additionally measured, particularly if there is a clear difference between two recorded ambient brightnesses (a predetermined difference value in respect of the measured ambient brightness values is exceeded) or if an ambient brightness value above the predetermined brightness value and a second ambient brightness value below the predetermined brightness value is present. If the additional ambient brightness value measured is found to correspond to the first recorded ambient brightness value, for example, it can be assumed that the second recorded ambient brightness value is attributable merely to a transient situation-dependent change (e.g. a passing vehicle, etc.), and is therefore not be taken into account for determining the ambient brightness. However, for determining the ambient brightness it is also conceivable to carry out a particular number of measurements (for example, 11 measurements) and to use the ambient brightness value (or its trend, whether below or above the predetermined brightness value) as the actual ambient brightness value (or the actual trend) which has been recorded in the plurality of measurements. Finally, according to another option, a plurality of ambient brightness values can be recorded which are averaged and the average value compared with a predefined brightness value in order to decide whether the ambient brightness is low enough to activate a lighting source (e.g. for welcome lighting).

According to another advantageous embodiment it is conceivable, after successfully checking for the presence of an authorized mobile identification transmitter, that pre-authentication, on the part of the vehicle, is carried out with the identification transmitter, for which process, in contrast to authorization checking of the mobile identification transmitter, a plurality of data telegrams and therefore a more complex identification code is exchanged between vehicle and identification transmitter. If pre-authentication is successful, access to the vehicle can then be granted e.g. after actuation of a door handle.

According to another aspect, an access arrangement for a vehicle, in particular a motor vehicle, is created wherein access to the vehicle can be obtained by means of an authorized mobile identification transmitter. Here the access arrangement has a brightness sensor for measuring the ambient brightness of the vehicle. The brightness sensor can be embodied, for example, as a photodiode such as a silicon photodiode, advantageously with built-in color correction filter for the visible region. The access arrangement additionally has a communications device or more specifically a transceiver for checking for the presence of an authorized mobile identification transmitter in a proximity area around a vehicle. The access arrangement additionally has a control device for outputting an activation signal for a lighting source of the vehicle if the ambient brightness is below a predetermined brightness value and the presence of an authorized mobile identification transmitter in the proximity zone or proximity area is detected. The lighting source to be activated by the activation signal can include a lighting source already present on the vehicle, such as one or more flashing indicators, dipped beam headlights, etc. Once again, by using the ambient brightness of the vehicle for triggering or activating the lighting source, e.g. for welcome lighting, power savings can be realized, as the lighting is only activated when the ambient brightness values are low.

According to an advantageous embodiment, the control device is assigned an electronic time measuring device, i.e. a timer, which switches the control device from a first state with low power consumption to a second state with higher power consumption (i.e. "wakes up" the control device) in which the control device activates the brightness sensor to measure the ambient brightness. The timer can be an external timer which is connected to the control device via a signal line, or can be embodied as an internal timer of the control device.

If an ambient brightness value is recorded by the brightness sensor which is above a predetermined brightness value, the first state with low power consumption is reinstated in the control device or rather the control device is reset to the first state with low power consumption. If an ambient brightness value below the predetermined brightness value is eventually recorded by the brightness sensor, the control device is switched to a third state with high power consumption in order to trigger the transceiver to check for the presence of an authorized mobile identification transmitter. If an authorized mobile identification transmitter is eventually found, the control device will output the activation signal for the lighting source. However, if no authorized mobile identification transmitter is found (within the proximity area around the vehicle), the control device will revert to the first state with low power consumption.

According to another advantageous embodiment, the control device is assigned an electronic time measuring device, i.e. a timer, which switches the control device from a first state with low power consumption to a third state with a high power consumption in which the control device activates the transceiver to check for the presence of the mobile identification transmitter. In this respect the control device can be embodied such that it reverts to the first state if no mobile identification transmitter has been detected in the proximity area. On the other hand the control device can be embodied such that, after successfully checking for the presence of an authorized mobile identification transmitter, it triggers the brightness sensor to cause the ambient brightness of the vehicle to be measured. If an ambient brightness is found by the brightness sensor which is below the predetermined brightness value, the control device will output the activation signal for the lighting source, the control device reverting to the first state with low power consumption if the ambient brightness value recorded is above a predefined brightness value.

Finally, according to a third aspect, a motor vehicle with the access arrangement just described or an embodiment thereof is created.

Advantageous embodiments of the method described above insofar as they are transferable to the arrangement or the motor vehicle must also be regarded as advantageous embodiments of the arrangement or the motor vehicle.

Reference will first be made to FIG. 1 in which an access authorization system or access arrangement ZA is shown which is designed for the applications in a vehicle, here the motor vehicle FZ, said access arrangement ZA comprising a brightness sensor HS for measuring the ambient brightness of the motor vehicle FZ. The brightness sensor HS can be embodied, for example, as a photodiode with built-in color correction filter for the visible region and can supply (ambient) brightness values HW to a control device STE so that the latter can compare this brightness value HW with a predetermined brightness threshold value SHW. The access arrangement ZA additionally comprises a transceiver SE which is capable of exchanging radio signals or more specifically data telegrams with one or more mobile identification transmitters, here the identification transmitter IDG via an antenna ANF or radio interface FSS. As will be explained in even greater detail below, the transceiver SE sends out challenge signals with a particular signal field strength so that only an identification transmitter IDG which is in a proximity area ANB around the vehicle can receive the challenge signals of the transceiver SE and, on receiving same, can send back a corresponding response signal e.g. with a short identification transmitter code to the transceiver SE. This identification transmitter code received by the (vehicle-end) transceiver can then be analyzed by the transceiver SE or by the (vehicle-end) control device STE connected thereto in order to establish an association between the identification transmitter IDG and the motor vehicle FZ.

Depending on the measured ambient brightness and an ascertained presence or absence of an ID-transmitter in the proximity area around the motor vehicle FZ, the control device STE is finally designed to feed out a light control signal LSS to a light control device which ultimately controls a lighting device or lighting source BL. The lighting device BL can comprise, for example, one or more flashing indicators of the motor vehicle FZ, the dipped beam headlights, the interior lighting, etc.

For supplying power, the vehicle has a battery BAT which for reasons of clarity of representation is connected only to the control device STE, but also supplies power to the remaining components of the motor vehicle FZ.

Reference will now be made to the left-hand section of FIG. 1 showing the mobile identification transmitter IDG which can be embodied, for example, as an electronic key. The identification transmitter IDG is illustrated schematically here and comprises an antenna ANI for receiving radio signals or data telegrams emitted via the vehicle-end antenna ANF which after reception are then forwarded to a transceiver (at the identification transmitter end) which processes the radio signals or data telegrams and finally forwards them to a control device STI at the identification transmitter end.

If an identification transmitter IDG, as shown at far left in FIG. 1, is outside the proximity area ANB around the motor vehicle FZ, i.e. the distance from it to the motor vehicle FZ is greater than the approach distance ANR, the identification transmitter IDG will receive no challenge signals emitted by the vehicle-end transceiver SE via the antenna ANF. On the other hand, if the identification transmitter IDG moves in the direction of the arrow PF toward the motor vehicle FZ (because a motor vehicle user with the identification transmitter IDG in his/her pocket is also approaching the motor vehicle FZ), the identification transmitter IDG eventually arrives in the proximity area ANB of the motor vehicle FZ. Here it will eventually receive a challenge signal ANS of the motor vehicle FZ via an antenna ANI, process it by means of the transceiver SEI and analyze it by means of the control device STI. Finally the control device STI will send out, via the transceiver SEI and the antenna ANI, a response signal AWS containing a short key code or identification transmitter code. As already mentioned, this key code can be forwarded via the antenna ANF and the vehicle-end transceiver to the control device STE where it is finally analyzed to ascertain whether the identification transmitter is an authorized identification transmitter, i.e. assigned to the vehicle FZ.

Reference will now be made to FIG. 3 which schematically illustrates the states or conditions for light control or lighting control of the lighting device BL. On the left-hand side of FIG. 3 are depicted two so-called actuators, namely an identification transmitter checking device (which can be represented, for example, by the vehicle-end transceiver SE and in some cases by the control device STE) and a brightness sensor (corresponding to the brightness sensor HS in FIG. 1). As already mentioned above, these two actuators supply values which are eventually analyzed in the control device STE according to predetermined conditions in order to control the lighting device BL depending on the fulfillment of the predetermined conditions in order to implement a convenience function of the access arrangement ZA, namely "welcome lighting".

On the basis of a trigger that an authorized mobile identification transmitter (compare explanation to FIG. 1) is within the proximity area ANB of the vehicle FZ and on the basis of the trigger that an ambient brightness below the predetermined brightness threshold value SHW has been detected by the brightness sensor, the state (in the control device) is attained in which the lighting device BL or more specifically the vehicle lighting is to be switched on. On the other hand, on the basis of a trigger that an authorized mobile identification transmitter is outside the proximity area ANB of the vehicle FZ and on the basis of the trigger that the brightness sensor has detected an ambient brightness whose value is above the predefined brightness threshold value, a state is reached in which the lighting device BL or vehicle lighting is not to be switched on or is to be switched off. A corresponding implementation of a relevant state must then be communicated to the light control device LSE which must implement the relevant state change as a result, namely either to switch the vehicle lighting off or to switch the vehicle lighting on.

Reference is now made to FIG. 2 which schematically illustrates the value range of the brightness value measured by the brightness sensor HS. The brightness value ranges from a value with low light intensity, by which darkness is represented, to a value with high light intensity, with which brightness is represented. In addition, a predefined brightness value or more specifically brightness threshold value SHW is marked in the drawing approximately in the middle of the value range of the brightness value HW. As already explained above, to determine the (actual) ambient brightness, not only one brightness value HW is measured by the brightness sensor HS, but a plurality of brightness values. The advantage is that a fluctuation in the measured brightness values is analyzed and can be compensated if necessary. If, for example, a first ambient brightness value is measured while e.g. a large truck is passing the motor vehicle FZ, a brightness value with low light intensity may be recorded for this measurement. Once the truck has passed the vehicle FZ, another brightness value measured will represent a higher light intensity. In particular, if both brightness values measured are close to the predetermined brightness threshold value SHW, one brightness value below the threshold value, the other brightness value above the threshold value, it would now be very difficult for the control device STE to decide whether or not the vehicle lighting is to be switched on for welcome lighting purposes. By measuring more than the two brightness values just mentioned, it can now be checked in various ways which brightness value corresponds to the "actual" ambient brightness value. By measuring a plurality of brightness values, e.g. eleven brightness values in succession, it can be ascertained, for example, that an "actual" ambient brightness greater than the predetermined brightness value SHW is present if the plurality of brightness values measured are above the predetermined brightness value SHW. If the plurality of brightness values recorded are below the predetermined brightness value SHW, it can be assumed that the "actual" ambient brightness assumes a value below the predetermined brightness value SHW. Providing the hysteresis indicated in FIG. 2 therefore makes the method for determining an ambient brightness less prone to fluctuations. It should therefore be noted for explanation of the following figures that determination of an ambient brightness can be based either on measurement of one ambient brightness value by the brightness sensor HS, or on a plurality of measured brightness values, as just explained.

Reference is now made to FIG. 4 in which a flowchart for operating the access arrangement ZA of FIG. 1 according to a first embodiment is explained. To save power/energy, it is assumed in an initial state, i.e. in a first step S0, that the control device STE of the vehicle is in a first state ZS1 with low power consumption. At defined time intervals or more specifically at particular time instants ZP1 (or ZP2, ZP3, ZP4), an internal time measuring device i.e. a timer (cf. FIG. 1) of the control device STE will wake up the control device STE or more specifically put it into a second state ZS2 with medium (or relative to the first state higher) power consumption. Such a cyclical "wake-up" takes place e.g. in step S1. In step S2, i.e. in the second state the control device STE now activates the brightness sensor HS, causing it to measure an ambient brightness value and forward same to the control device STE. The control device STE now compares the received brightness value HW (cf. FIG. 2) with the predetermined brightness threshold value SHW and ascertains in this case from step S2 that the brightness value measured is above the predetermined brightness threshold value SHW, and therefore the condition for switching on the vehicle lighting for welcome lighting does not obtain. As already mentioned, to determine the "actual" ambient brightness not only one brightness value can be measured, but a plurality of brightness values, for reasons of clarity of illustration only one brightness value now being used here to determine the actual ambient brightness value.

As the "brightness condition" did not obtain in step S2, in step S3 the control device STE will revert to the first state ZS1 with low power consumption.

Correspondingly, at instant ZP2 in step S4 the control device STE is woken up again, causing an ambient brightness value HW to be measured in step S5 and, in step S6, reverting to state ZS1 with low power consumption, as the measured or rather determined ambient brightness value has been above the predetermined brightness value.

Now at instant ZP3 in step S7 the control device STE is woken up again by the internal timer IT and placed in the second state ZS2. The control device STE activates the brightness sensor HS to cause the ambient brightness to be measured, the ambient brightness value measured now being below the predetermined brightness value SHW. The control device STE therefore assumes a third state ZS3 with high power consumption in which it activates the vehicle-end transceiver SE to look for a mobile identification transmitter in the proximity area ANB around the vehicle FZ. The vehicle-end transceiver SE now therefore begins to send out a plurality of challenge signals ANS (cf. FIG. 1) to which a mobile identification transmitter IDG present in the proximity area ANB would respond. After a particular search time interval ZSE or after a particular number of transmitted signals to which no response signal of a mobile identification transmitter has been received, the control device STE ascertains that no mobile identification transmitter IDG is in the proximity area ANB, and therefore, in step S10, reverts to the first state ZS1 with low power consumption.

Finally, in step S11, the control device STE is returned by the internal timer IT at instant ZP4 to the second state ZS2 in which it triggers the brightness sensor HS to measure the ambient brightness, in this case the measured ambient brightness value HW again being below the predetermined brightness value SHW so that, in step S12, the control device STE returns to the third state ZS3. In step S13, like in step S9, an (authorized) mobile identification transmitter is again looked for in the proximity area ANB around the vehicle FZ, a response or more specifically a response signal AWS now being received within the search time interval ZSE from a mobile identification transmitter IDG with a valid identification code by the vehicle-end transceiver SE, and the control device STE establishing the presence of an authorized mobile identification transmitter in the proximity area ANB. In step S14 it therefore sends a light control signal LSS here in the form of an activation signal AS to the light control device LSE, so that the latter triggers the lighting device BL to illuminate or radiate light. If the lighting device BL is embodied e.g. as a flashing indicator, flashing can now be performed for a predetermined time or until eventual unlocking of the vehicle door.

If the mobile identification transmitter IDG just found is in the proximity area ANB for a longer time and continues to approach the vehicle FZ, in step S15 an authentication process on the part of the vehicle is performed with the mobile identification transmitter IDG during which further data telegrams are exchanged, the mobile identification transmitter IDG here transmitting its authentication code to the vehicle FZ or more specifically to the vehicle-end transceiver SE.

If finally the vehicle owner with his mobile identification transmitter IDG has arrived close enough to the vehicle FZ to actuate the vehicle's door handle, in step S16 he will actuate the door handle to indicate his desire to enter the vehicle. If authentication in step S15 was successful (i.e. if the control device STE has ascertained a correct authentication code of the mobile identification transmitter IDG), the control device STE will transmit an unlocking signal ES directly to a particular door lock, or to a central locking system, so that a particular door such as the driver's or all the doors of the vehicle are unlocked.

Reference is now made to FIG. 5 which shows another embodiment for operating an access arrangement. It is again assumed that the control device STE of the vehicle FZ is initially, i.e. in step T0, in a first state ZS1 with low power consumption. At instant ZP1 the control device STE is again woken up by the internal timer IT in step T1 and now immediately placed in a state ZS3 (corresponding to the third state of FIG. 4) with high power consumption. In step T2 the control device STE now triggers the vehicle-end transceiver SE to send out challenge signals ANS in order to "look for" a mobile identification transmitter IDG within the proximity area ANB of the vehicle FZ (cf. also steps S9, S13 in FIG. 4). After the search time interval ZSE for finding a mobile identification transmitter has expired and/or after a predetermined number of challenge signals ANS have been sent out, and no mobile identification transmitter has responded to the challenge signals, in step T4 the control device STE will revert to the first state ZS1 with low power consumption.

At instant ZP2, in step T5, the control device STE is woken up again by the internal timer IT and placed in state ZS3 with high power consumption in order to search for a mobile identification transmitter IDG. In the following, the steps T6 to T8 are carried out as per steps T2 to T4.

At instant ZP3, in step T9, the control device STE is woken up again by the internal timer IT and placed in state ZS3 in order to trigger the vehicle-end transceiver to search for a mobile identification transmitter. In step T10 the transceiver SE begins to send out a plurality of challenge signals ANS, a mobile identification transmitter IDG now being present within the proximity area ANB of the vehicle FZ. The mobile identification transmitter IDG therefore returns a response signal AWS with its identification transmitter code to the transceiver SE in step T11. As a criterion for triggering the lighting device for welcome lighting functionality it is conceivable to assume that a mobile identification transmitter IDG is within a proximity area ANB approximately corresponding to the transmit/receive range of the transceiver device SE. In this case the control device STE could immediately continue with step T13 by triggering the brightness sensor HS to measure the ambient brightness. However, for activating the welcome lighting it is also conceivable to define as the criterion that the mobile identification transmitter (with its vehicle user) must be located in a second proximity area ANB2 which is within the proximity area ANB and has a short distance or radius from the vehicle FZ. Therefore, in order to check for the presence of this criterion, it is verified in step T12 whether the mobile identification transmitter is within the second proximity area ANB2.

It is now assumed that the mobile authentication transmitter is in the second proximity area ANB2 (or if the first distance criterion suffices, is at least in the proximity area ANB), so that in step T13 the control device triggers the brightness sensor HS to measure an ambient brightness value. If an ambient brightness value is now measured and/or determined which is below the predetermined brightness threshold value SHW, in step T14 the control device STE, after analyzing the ambient brightness value determined, will transmit a light control signal LSS with an activation signal to the light control device LSE, so that the light control device LSE triggers the lighting device BL to activate lighting. If, on the other hand, an ambient brightness is measured which is below the predetermined brightness threshold value SHW, in step T15 a light control signal LSS with a deactivation signal is fed out to the light control device LSE so that the light control device LSE triggers the lighting device such that lighting is switched off or at least not switched on.

If finally in step T16 it is detected that the mobile identification transmitter is no longer within the second proximity area ANB2 (or is no longer within the first proximity area ANB), in particular without unlocking of the vehicle having taken place, the control device STE feeds out a light control signal LSS to the light control device LSE in which the latter is instructed to switch off (or at least not switch on) the lighting device or rather its lighting.

To summarize, it can therefore be ascertained that both according to the embodiment in FIG. 4, initially in a state of medium power consumption only the ambient brightness is measured and changeover to a state with high power consumption (actual normal operation) only actually takes place when "darkness" is present in order to perform searching for a mobile identification transmitter. If the darkness criterion is not fulfilled, the control device STE reverts to a state with low power consumption (sleep state) in order to be woken up again by an internal timer after a certain time.

As in the second embodiment according to FIG. 5, an ambient brightness is actually measured only if the first criterion is present, here that a mobile identification transmitter is present in a (first or second) proximity area around the vehicle. If the first criterion is not fulfilled, the control device STE likewise reverts to a (first) state with low power consumption in order to be woken up again after a certain time by an internal timer in order to check for the presence of a mobile identification transmitter.

In both embodiments, a lighting device is finally activated to implement welcome lighting only if both criteria (darkness and presence of an ID transmitter) are fulfilled. In this way, the power consumption for the convenience function "welcome lighting" for the access arrangement ZA can be dramatically reduced.

Moreover, according to another embodiment (referring to the illustration in FIG. 1) an access arrangement ZA for a vehicle FZ can be created wherein, as in the other embodiments described above, access to the vehicle can be obtained by means of an authorized mobile identification transmitter IDG. The access arrangement likewise has a brightness sensor HS for measuring the ambient brightness HW around the vehicle FZ. The access arrangement additionally comprises a transceiver SE for checking for the presence of an authorized identification transmitter in a proximity area ANB, ANB2 around the vehicle. As also described above with respect to the other embodiments, the presence can be checked for such that the transceiver SE sends out signals such as low-frequency electromagnetic signals with a particular field strength at regular intervals (cyclically), and the presence of an identification transmitter in a proximity area is detected when its response signal is received. In any subsequent dialog between transceiver and identification transmitter, the authorization of the identification transmitter for the vehicle can then also be transmitted, e.g. by transmission of an identification code from the identification transmitter to the transceiver. The characteristic feature of the access arrangement of this embodiment compared to the other embodiments is that it has a control device STE which is designed to output a start signal for the transceiver which causes the transceiver to check for the presence of the identification transmitter if the ambient brightness is less than a predetermined brightness value SHW. This means that a presence check is only initiated by the transceiver when the vehicle is in darkness, so that under bright ambient conditions the vehicle's energy source, such as the vehicle battery, can be spared and therefore its service life extended.

If the ambient brightness now falls below a predetermined brightness value, the control device STE will, as explained above, instruct the transceiver to check for the presence of an identification transmitter. If the transceiver ascertains the presence of an identification transmitter or more specifically an authorized identification transmitter, it will, according to one embodiment, inform the control device, whereupon the latter finally outputs an activation signal LSS (possibly via a light control device LSE) to a lighting source BL so that the latter is triggered to illuminate or more specifically radiate light. However, the outputting of the activation signal can also be made dependent on an authorized identification transmitter being detected by the transceiver. If the lighting device BL is embodied e.g. as a flashing indicator, flashing can now be performed for a predetermined time interval or until final unlocking of a vehicle door. After activation of the lighting device, the access arrangement of this last embodiment operates in the same way as the previously described embodiments.

As in the case of the other embodiments, the brightness sensor can be embodied as a special ambient light sensor which measures the general light intensity around the vehicle. However, it is also conceivable for the brightness sensor function to be performed by a combined rain-light sensor which is also used for the automatic wiper and headlight control functions.

The invention claimed is:

1. A method for operating an access arrangement for a vehicle, wherein access to the vehicle can be obtained by means of a mobile identification transmitter, comprising the following steps:
   determining an ambient brightness around the vehicle;
   checking for the presence of an authorized mobile identification transmitter in a proximity area around the vehicle;
   outputting an activation signal for a lighting source of the vehicle if the ambient brightness is below a predetermined brightness value and the presence of an authorized mobile identification transmitter is detected in the proximity area,
   wherein the ambient brightness is first determined and the presence of the identification transmitter is only checked for if an ambient brightness below the predetermined brightness value is present.

2. The method according to claim 1, wherein a control device is switched from a first state with low power consumption to a second state with medium power consumption at defined instants in order to initiate measurement of the ambient brightness, the control device being returned to the first state ZS1 with low power consumption if an ambient brightness above the predetermined brightness value is measured.

3. The method according to claim 1, wherein if an ambient brightness below the predetermined brightness value is detected, the control device is switched to a third state with high power consumption in order to check for the presence of an authorized identification transmitter.

4. A method for operating an access arrangement for a vehicle, wherein access to the vehicle can be obtained by means of a mobile identification transmitter, comprising the following steps:
   determining an ambient brightness around the vehicle;
   checking for the presence of an authorized mobile identification transmitter in a proximity area around the vehicle;
   outputting an activation signal for a lighting source of the vehicle if the ambient brightness is below a predetermined brightness value and the presence of an authorized mobile identification transmitter is detected in the proximity area, wherein the presence of an authorized identification transmitter is first checked for, and, in the event of a positive result, forwarding of the ambient brightness around the vehicle is performed,
   wherein at defined instants a control device is switched from a first state with low power consumption to a third state with high power consumption in order to check for the presence of the authorized identification transmitter, the control device reverting to the first state with low power consumption in the event of a negative result.

5. A method for operating an access arrangement for a vehicle, wherein access to the vehicle can be obtained by means of a mobile identification transmitter, comprising the following steps:
   determining an ambient brightness around the vehicle;
   checking for the presence of an authorized mobile identification transmitter in a proximity area around the vehicle;
   outputting an activation signal for a lighting source of the vehicle if the ambient brightness is below a predetermined brightness value and the presence of an authorized mobile identification transmitter is detected in the proximity area, wherein to determine the ambient brightness at least two ambient brightness values are measured, and
   wherein if one ambient brightness value measured is greater than the predetermined brightness value and a second ambient brightness value measured is less than the predetermined brightness value at least one other ambient brightness value is measured to determine the ambient brightness.

6. The method according to claim 1, wherein after successful verification of the presence of the authorized mobile identification transmitter, authentication is carried out on the part of the vehicle with the identification transmitter in order to enable at least one door of the vehicle to be unlocked.

7. An access arrangement for a vehicle, wherein access to the vehicle can be obtained by means of a mobile identification transmitter, comprising the following features:
   a brightness sensor for measuring the ambient brightness around the vehicle;
   a transceiver for checking for the presence of an authorized identification transmitter in a proximity area around the vehicle;
   a control device for outputting an activation signal for a lighting source if the ambient brightness is less than a predetermined brightness value and the presence of an authorized mobile identification transmitter is detected in the proximity area,
   wherein the control device is assigned a timer which switches the control device from a first state with low power consumption to a second state with medium power consumption in which the control device triggers the brightness sensor to measure the ambient brightness.

8. The access arrangement according to claim 7, wherein the control device reverts to the first state with low power consumption if the ambient brightness measured by the brightness sensor is above the predetermined brightness value.

9. The access arrangement according to claim 7, wherein the control device assumes a third state with high power consumption if the ambient brightness value measured by the brightness sensor is below the predetermined brightness value, in order to trigger the transceiver SE to check for the presence of an authorized identification transmitter.

10. The access arrangement according to claim 7, wherein the control device is assigned a timer which switches the control device from a first state with low power consumption to a third state with high power consumption in which the control device triggers the transceiver to check for the presence of the mobile identification transmitter.

11. The access arrangement according to claim 10, wherein the control device reverts to the first state if no mobile identification transmitter has been detected in the proximity area.

12. The access arrangement according to claim 10, wherein the control device, after successfully checking for the presence of the mobile identification transmitter, additionally triggers the brightness sensor to measure the ambient brightness.

13. The access arrangement according to claim 7, wherein the brightness sensor has a photodiode, in particular with built-in color correction filter for the visible wavelength region.

14. A motor vehicle with an access arrangement, wherein access to the vehicle can be obtained by means of a mobile identification transmitter, comprising the following features:
   a brightness sensor for measuring the ambient brightness around the vehicle;
   a transceiver for checking for the presence of an authorized identification transmitter in a proximity area around the vehicle;

a control device for outputting an activation signal for a lighting source if the ambient brightness is less than a predetermined brightness value and the presence of an authorized mobile identification transmitter is detected in the proximity area, wherein the control device is assigned a timer which switches the control device from a first state with low power consumption to a second state with medium power consumption in which the control device triggers the brightness sensor to measure the ambient brightness.

15. The motor vehicle according to claim 14, wherein the control device reverts to the first state with low power consumption if the ambient brightness measured by the brightness sensor is above the predetermined brightness value.

16. The method according to claim 4, wherein after successful verification of the presence of the authorized mobile identification transmitter, authentication is carried out on the part of the vehicle with the identification transmitter in order to enable at least one door of the vehicle to be unlocked.

17. The method according to claim 5, wherein after successful verification of the presence of the authorized mobile identification transmitter, authentication is carried out on the part of the vehicle with the identification transmitter in order to enable at least one door of the vehicle to be unlocked.

\* \* \* \* \*